(12) United States Patent
Hosler et al.

(10) Patent No.: US 9,844,124 B2
(45) Date of Patent: Dec. 12, 2017

(54) METHOD, APPARATUS AND SYSTEM FOR USING FREE-ELECTRON LASER COMPATIBLE EUV BEAM FOR SEMICONDUCTOR WAFER METROLOGY

(71) Applicant: GLOBALFOUNDRIES Inc., Grand Cayman (KY)

(72) Inventors: Erik Robert Hosler, Cohoes, NY (US); Pawitter J. S. Mangat, Malta, NY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 236 days.

(21) Appl. No.: 14/645,871

(22) Filed: Mar. 12, 2015

(65) Prior Publication Data

US 2016/0270200 A1    Sep. 15, 2016

(51) Int. Cl.
*H05G 2/00* (2006.01)
*H01S 3/09* (2006.01)

(52) U.S. Cl.
CPC ............. *H05G 2/00* (2013.01); *H01S 3/0903* (2013.01)

(58) Field of Classification Search
CPC ............. H05H 13/04; H05H 2007/041; H05H 2007/046; H05H 2007/084; H05H 2007/04; H05H 2007/045; H05G 2/00; H01S 3/0903
See application file for complete search history.

(56) References Cited

U.S. PATENT DOCUMENTS

2014/0048707 A1* 2/2014 Liu ................. H05H 13/04
315/503
2016/0226212 A1* 8/2016 Tajima ............. H01S 3/067

\* cited by examiner

*Primary Examiner* — Brooke Purinton
(74) *Attorney, Agent, or Firm* — Williams Morgan, P.C.

(57) ABSTRACT

At least one method, apparatus and system for providing capturing synchrotron radiation for a metrology tool, are disclosed. A beam using a first light emitting device is provided. The first light emitting device comprises a first electron path bend. A first synchrotron radiation is provided from the first electron path bend to a first metrology tool configured to perform a metrology inspection using the first synchrotron radiation.

20 Claims, 9 Drawing Sheets

METHOD, APPARATUS AND SYSTEM FOR USING FREE-ELECTRON LASER COMPATIBLE EUV BEAM FOR SEMICONDUCTOR WAFER METROLOGY

FIELD OF THE INVENTION

Generally, the present disclosure relates to using optics for the manufacture of sophisticated semiconductor devices using, and, more specifically, to various methods and structures for using free-electron laser compatible EUV beam for semiconductor wafer metrology.

DESCRIPTION OF THE RELATED ART

The technology explosion in the manufacturing industry has resulted in many new and innovative manufacturing, testing, and analysis processes. Today's manufacturing processes, particularly semiconductor manufacturing processes, call for a large number of important steps as well as analysis of the results of the manufacturing processes. These process and analyses steps are usually vital, and therefore, require a number of inputs that are generally fine-tuned to maintain proper manufacturing control.

The manufacture of semiconductor devices requires a number of discrete process steps to create a packaged semiconductor device from raw semiconductor material. The various processes, from the initial growth of the semiconductor material, the slicing of the semiconductor crystal into individual wafers, the fabrication stages (etching, doping, ion implanting, photolithography, or the like), to the packaging and final testing of the completed device, are so different from one another and specialized that the processes may be performed in different manufacturing locations that contain different control schemes.

Generally, a set of processing steps is performed on a group of semiconductor wafers, sometimes referred to as a lot, using semiconductor-manufacturing tools, such as an exposure tool or a stepper/scanner. Photolithography processes are an important part of forming geometric patterns on a semiconductor wafer. Often ultraviolet (UV) light sources are used to create geometric patterns on a photoresist layer on a semiconductor substrate through a masking layer that defines these patterns. State of the art photolithography processes include using argon-fluoride lasers to generate UV light for generating patterns on the substrate. The masking layers, called reticles or masks, are used to define the pattern on the semiconductor wafer. It is desirable that the mask metrology is performed prior to any exposure to light for defects to confirm defect free printability. Typical this is also done at the exposure wavelength used to print the semiconductor wafer. Further, metrology data acquisition and analysis are performed following the photolithography processes.

Light sources providing sufficient power in the extreme ultraviolet (EUV) range are required to shrink the wavelength of light currently used in photolithography. Currently available lasers, e.g., argon-fluoride lasers, having sufficient power for HVM generally lack a natural active lasing medium to produce EUV light. As a result, designers have used micron scale tin (Sn) droplets that are super-radiated with a $CO_2$ laser at high (kilowatt) power. This generates highly-charged tin particles that may be used to as an active lasing medium to potential produce HVM compatible EUV lasers via a process known as laser-produced plasma (LPP). However, the state of the art lacks an efficient means for producing HVM compatible EUV power for semiconductor manufacturing. Moreover, the prior art lacks an efficient methodology for utilizing energy intrinsically generated by high power lasers for high-resolution inspection/metrology.

Designers have suggested a single source, high-power free electron laser (FEL) for use in photolithography processes in semiconductor wafer processing, however, intrinsic energy from such lasers have not been harnessed. FIG. 1 illustrates a typical FEL source. FIG. 2 illustrates a typical superconducting accelerator of FIG. 1. Referring simultaneously to FIGS. 1 and 2, an electron gun 110 comprises an electron source and an electron injector. The electron gun 110 defines various parameters of the generated electron bunches. The electron bunches are sent through a superconducting accelerator unit 120. As shown in FIG. 2, the superconducting accelerator unit 120 contains a $1^{st}$ through $N^{th}$ superconducting radio frequency (SRF) cavities 210-230. The series of SRF cavities 210-230 accelerate the electron bunches to relativistic velocities.

Upon accelerating the electron bunches to relativistic velocities, the electron bunches are sent to an undulator 130. The undulator 130 comprises a plurality of strategically positioned magnets of alternating polarity. The undulator 130 comprises an undulator period and magnetic strength parameters for a particular electron beam energy. The undulator 130 is used to oscillate the electron bunches to generate radiation that is proportional to the undulator period, undulator magnetic strength, and the electron beam energy provided by the SRF cavities to yield the desired wavelength give the undulator configuration. After processing by the undulator 130, the energy is sent to a separator 140, which separates the generated radiation and the electron beam, which may be recycled or dumped, as indicated by the electron dump 150. The generated radiation is provided to the EUV optics 160, which then processes the radiation and provides radiation (FEL laser light) compatible with photolithography. The FEL laser may then be used to perform lithography processing upon semiconductor wafers. In many cases the distance from the electron gun 110 and the separator 140 may be approximately 100 meters.

The prior art designs of such lasers are not conducive for harnessing intrinsic energy from generating the beams for manufacturing-related purposes, such as metrology data acquisition and analysis. Further, the real estate required to house the large state of the art FEL sources, bury the FEL sources 100, and place it outside the minimum distance from the fab is a substantial undertaking and costly.

FIG. 3 illustrates a stylized depiction of a prior art multi-pass accelerator of an accelerator unit of an FEL source. An accelerator unit 310 of an FEL source of FIG. 3 includes a multi-pass accelerator 320. The multi-pass accelerator 320 includes an electron path 330 that comprises a plurality of bends, wherein the electrons from the path 330 is provided to an undulator. An appreciable amount of energy is generated and lost at each of the bends of the electron path. The state of the art lacks an efficient means for harnessing this energy.

The present disclosure may address and/or at least reduce one or more of the problems identified above.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

Generally, the present disclosure is directed to various methods, apparatus and system for providing and capturing synchrotron radiation for a metrology tool. A beam using a first light emitting device is provided. The first light emitting device comprises a first electron path bend. A first synchrotron radiation is provided from the first electron path bend to a first metrology tool configured to perform a metrology inspection using the first synchrotron radiation.

BRIEF DESCRIPTION OF THE DRAWINGS

The disclosure may be understood by reference to the following description taken in conjunction with the accompanying drawings, in which like reference numerals identify like elements, and in which.

Figure 1:
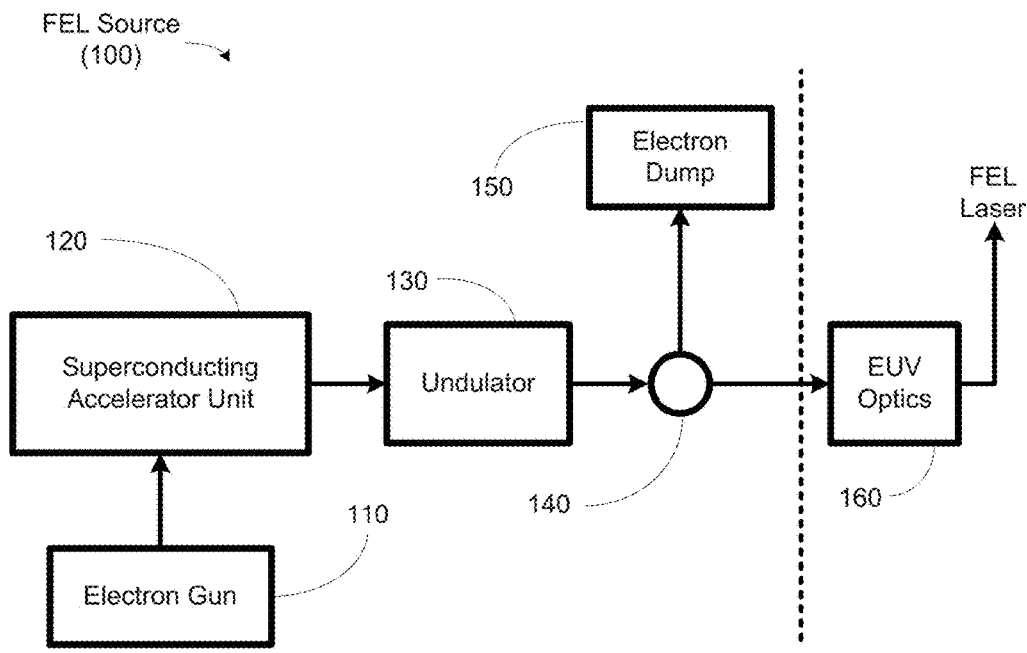
FIG. 1 illustrates a stylized depiction of a typical FEL source.
Figure 2:
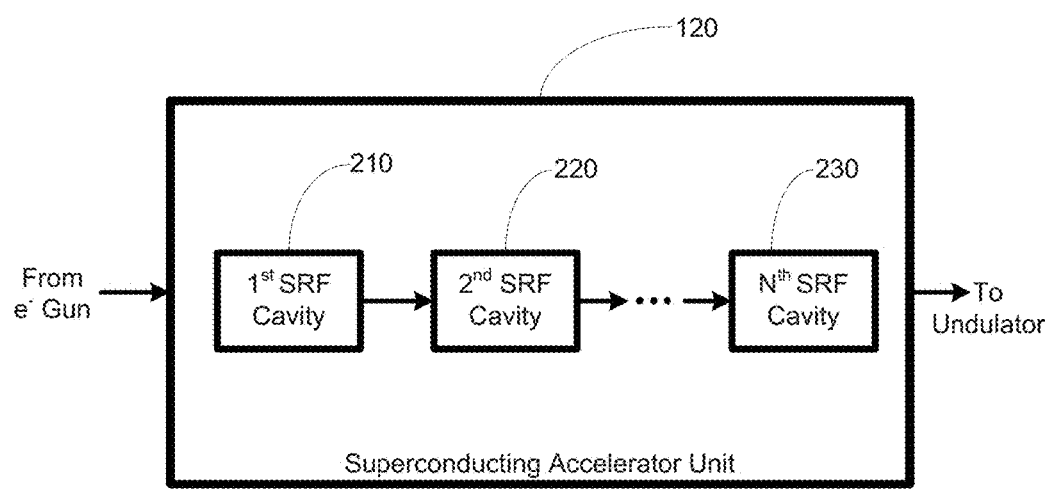
FIG. 2 illustrates a stylized depiction prior art superconducting accelerator of the FEL source of FIG. 1.
Figure 3:
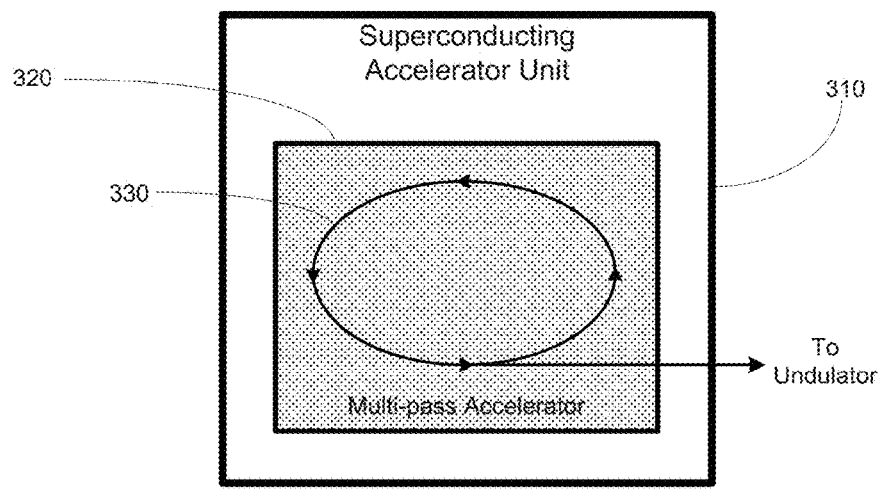
FIG. 3 illustrates a stylized depiction of a prior art multi pass accelerator of an FEL source.

While the subject matter disclosed herein is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Various illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present subject matter will now be described with reference to the attached figures. Various structures, systems and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Embodiments herein provide for a system for utilizing multiple scanners with high wattage (e.g., 100's to 1000's of watts) light sources and providing light source for various wavelength metrology data collection from semiconductor wafers or reticle. Embodiments herein provide for an extreme ultraviolet (EUV) light source based upon integrating an FEL light source with a semiconductor fab for semiconductor processing operations and metrology inspection.

Embodiments herein provide for capturing synchrotron radiation energy from an electron beam and using the energy for operating one or more metrology tools capable of using light energy to perform metrology inspection of processed semiconductor wafers, including collecting metrology data. In some embodiments, synchrotron radiation energy generated at bending regions of an electron path in an accelerator of an FEL light source may be captured for generating optical energy for one or more metrology tools. In other embodiments, an EUV beamline may be divided, and portion of the EUV beamline may be distributed to processing tools and to one or more metrology tool.

Figure 4:
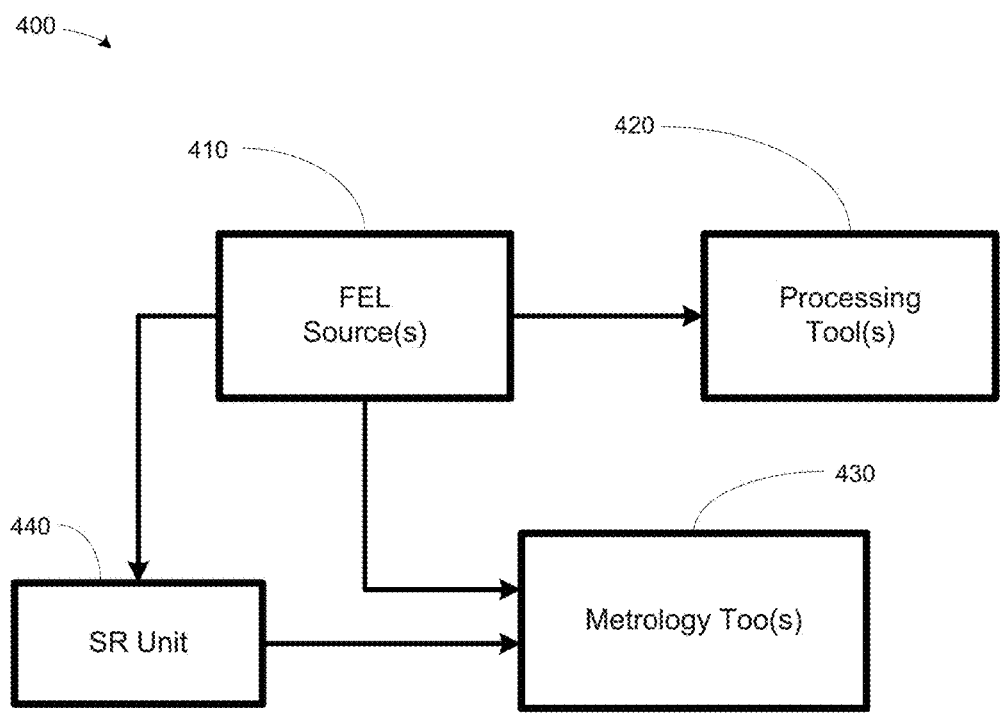
FIG. 4 illustrates a stylized depiction of a system for processing semiconductor wafers, in accordance with a some embodiment herein.

Turning now to FIG. 4, a stylized depiction of a system for processing semiconductor wafers, in accordance with a first embodiment, is illustrated. The system 400 may comprise one or more FEL sources 410 that are capable of providing light energy (e.g., EUV light) to one or more processing tools 420. The processing tools 420 may be a plurality of lithography tools that are capable of processing semiconductor wafers using EUV light. Moreover, the system 400 may comprise a plurality of metrology tools 430 capable of acquiring and providing metrology data from processed semiconductor wafers or reticles using light energy.

In some embodiments, the metrology tools 430 may utilize a light energy (e.g., EUV light) to perform metrology data acquisition. In some embodiments, the FEL sources 410 that provide light energy to the processing tools 420 may also provide light energy to the metrology tools 430. In one embodiment, light energy may be provided directly from the FEL sources 410 to the metrology tools 430. In another embodiment, a synchrotron radiation (SR) unit 440 may capture energy from the FEL sources 410 and provide the energy to the metrology tools 430. For example, the energy that may be wasted in the accelerators of the FEL sources 410, may be captured by the SR unit 440, wherein the captured energy may then be provided to the metrology tools 430 for performing metrology inspection.

One example of the energy that may be wasted during acceleration of electrons in accelerators of FEL sources 410 is synchrotron radiation. Embodiments herein are capable of utilizing synchrotron radiation generated proximally to the bending portions of an accelerator of FEL sources 410. The FEL sources 410 may comprise a multi-pass accelerator that may comprise a circular or elliptical path for accelerating electrons. Generally at the bending arcs of these accelerators, synchrotron radiation may be generated. Embodiments herein provide for capturing at least a portion of the synchrotron radiation for use in performing metrology data acquisition. The SR unit 440 is capable of capturing the synchrotron radiation generated by the accelerators of the FEL sources 410.

Figure 5:
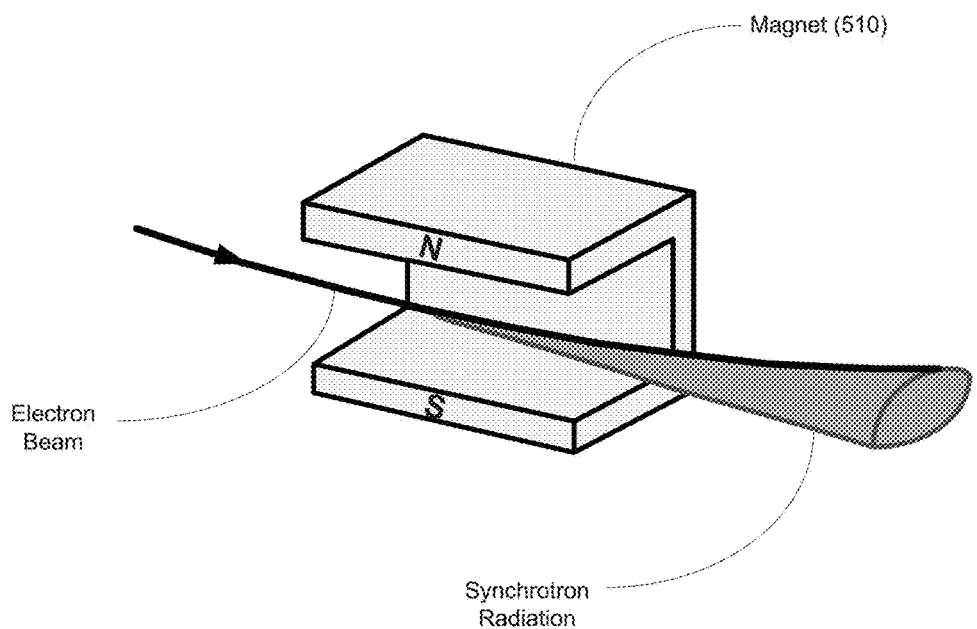
FIG. 5 illustrates an exemplary, stylized depiction of a magnet capable of producing synchrotron radiation from an electron beam, in accordance with some embodiments herein.

FIG. 5 illustrates an exemplary, stylized depiction of a magnet capable of producing synchrotron radiation from an electron beam, wherein the synchrotron radiation may be used by embodiments herein. An electron beam passing through a magnet 510 may generate synchrotron radiation, as exemplified in FIG. 5. The magnet 510 may also be used to change the path of the electron beam. Multi-pass Accelerators in the FEL sources 410 may comprise a plurality of magnets that are capable of altering the path of the electron beam. At each of the magnets, synchrotron radiation may be generated. The SR unit 440 is capable of directing the synchrotron radiation to metrology/inspection tools for performing metrology data acquisition for use in mask/reticle defect detection, failure analysis, imaging, etc.

Moreover, the synchrotron radiation may comprise broadband features such that its wavelength range for an EUV FEL may provide for performing chemical analysis spectroscopy (e.g., with element specificity), x-ray imaging capabilities, EUV imaging capabilities, etc. In embodiments herein, the metrology tools 430 may be configured to perform metrology inspection for a plurality of wavelengths generated by the FEL sources 410 (e.g., 13.5 nm).

Figure 6A:
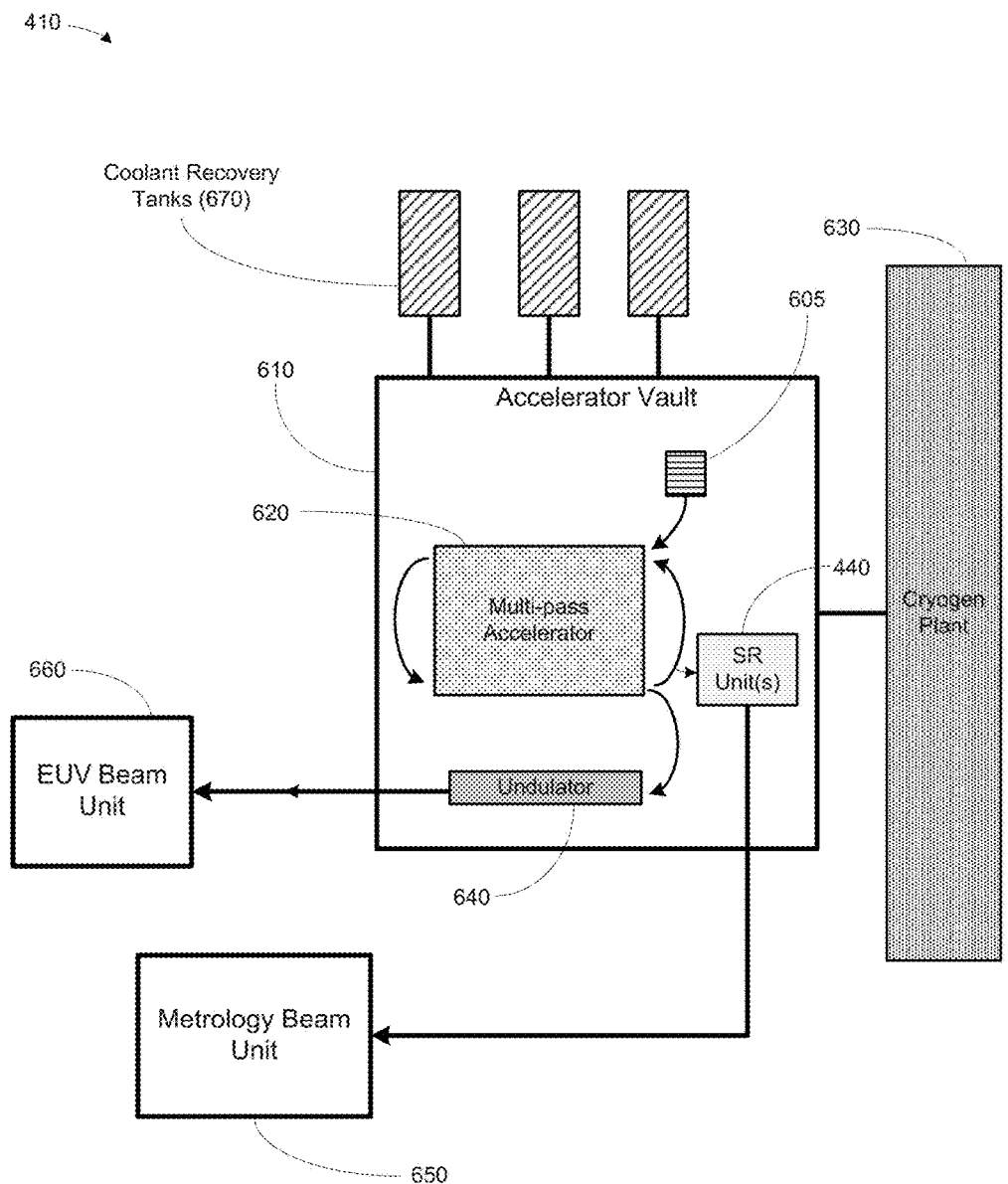
FIG. 6A illustrates a stylized block diagram depiction of the FEL source comprising a multi-pass accelerator in accordance with embodiments herein.

Turning now to FIG. 6A, a stylized block diagram depiction of the FEL source comprising at least one multi-pass accelerator in accordance with embodiments herein, is illustrated. As depicted in FIG. 6, the FEL source 410 may comprise one or more accelerator vaults 610 that are capable of generating an EUV beam and/or light energy for operating a metrology tool 430. For ease of description, only one accelerator vault 610 is illustrated in FIG. 6; however the FEL source 410 may comprise a plurality of accelerator vaults.

The accelerator vaults 610 of the FEL source(s) 410 may comprise a multi-pass accelerator 620 for accelerating electrons bunches provided by an electron source 605, as indicated by the curved arrow from an electron source 605 and the multi-pass accelerator 620. The multi-pass accelerator 620 may be a superconducting accelerator that is capable of accelerating the electron bunches to relativistic velocities. In some embodiments, the multi-pass accelerator 620 comprises a plurality of cryomodules through which the electrons are routed during the multi-pass of the electrons.

The FEL source 410 may also comprise a cryogen plant 630 that is capable of provide sufficient cooling for the operation of the multi-pass accelerator 620 and its plurality of cryomodules. The FEL source 410 may also comprise a plurality of coolant recovery tanks 670 (e.g., emergency He/$N_2$ tanks) for recovering coolant material.

Figure 6B:
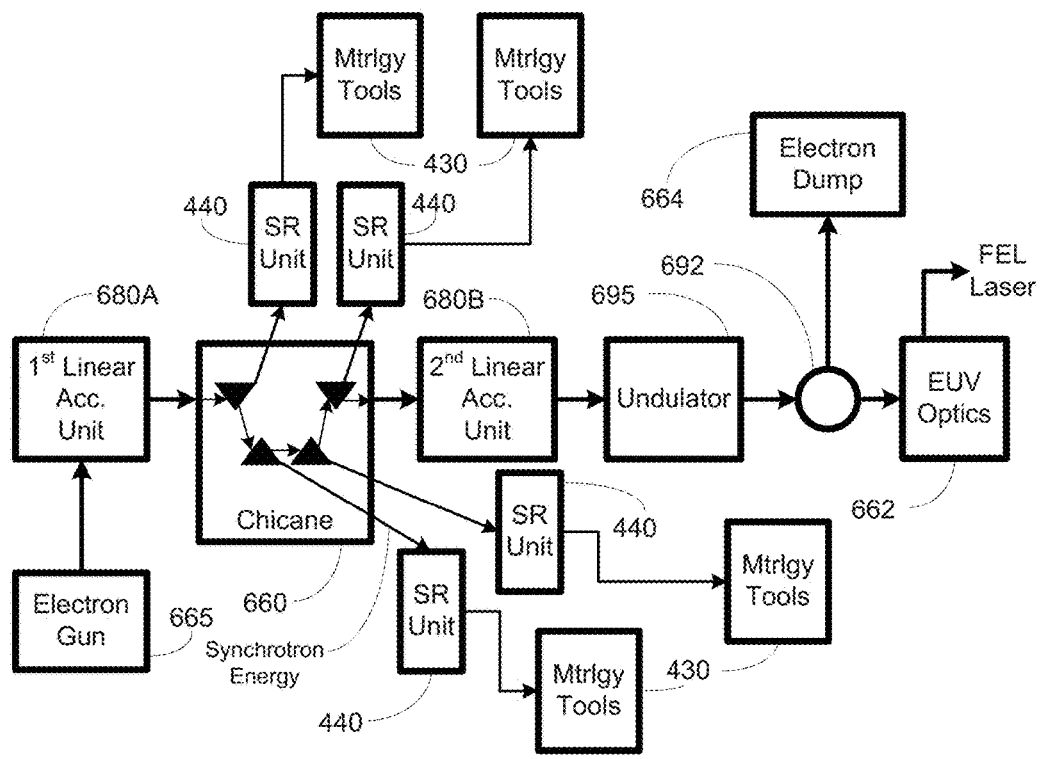
FIG. 6B illustrates a stylized block diagram depiction of a linear FEL source, in accordance with embodiments herein.
Figure 6C:
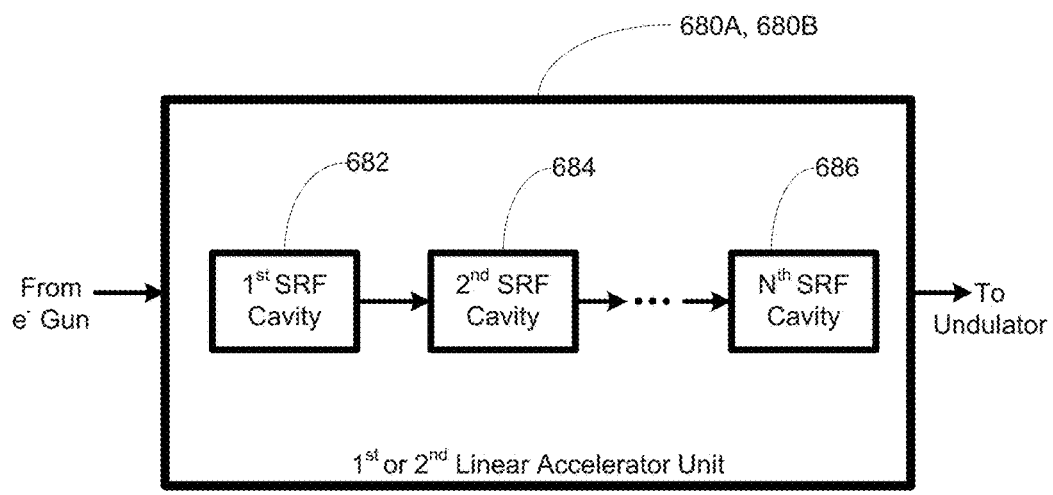
FIG. 6C illustrates a stylized block diagram depiction of linear accelerator unit of FIG. 6B, in accordance with embodiments herein.

An undulator 640 may be positioned adjacent to the multi-pass accelerator 620 in a "folded" configuration along the most convenient axis (e.g., beside, above, below, etc.) as determined by the particular embodiments of the facility configuration. In the example of FIG. 6, the undulator 640 is located adjacent to multi-pass accelerator 620, however, the undulator 640 may also for example be positioned above the multi-pass accelerator 620. In alternative embodiments, the FEL sources 410 may be configured in a linear configuration, wherein the undulator 640 may be positioned in series to the FEL source 410, and wherein the FEL sources 410 may require bends in the form of chicanes in lieu of recirculation loops, at which synchrotron radiation units 440 and metrology tool(s) 430 may be integrated. An exemplary application of a linear configuration of the FEL sources 410 is provided in FIGS. 6B and 6C, and accompanying descriptions below.

Continuing referring to FIG. 6A, electron paths (indicated by curved arrows) surrounding within multi-pass accelerator 610 may provide electron paths that are equivalent to standard linear path for an FEL source. The route of the electrons may be configured to provide sufficient travel length while reducing the linear length required for operations of the FEL sources 410, and in the case of multiple FEL sources 410, ensuring the FEL energy beams from the FEL sources 410 are emitted and directed in the same direction, or as dictated by the fab integration design as exemplified in FIG. 6A.

The undulator 640 provides energy beams (e.g., photon beams). The output (EUV beam) from the FEL source 410 is provided to an EUV beam unit 660, which may route the EUV beam to a portion of the semiconductor manufacturing fab. The EUV beam unit 660 may comprise one or more reflective surfaces that may be used to direct the EUV beam to various processing tools.

Further, the FEL source 410 may comprise one or more SR units 440 that are capable of capturing synchrotron energy from the multi-pass accelerator 620. The output of the SR unit(s) 440 may be provided to the metrology beam unit 650 for routing light energy to one or more metrology tools. In one embodiment, the metrology beam unit 650 may comprise one or more reflective surfaces that may be used to direct light energy to various metrology tools.

Referring simultaneously to FIGS. 6B and 6C, a stylized block diagram depiction of the linear FEL source in accordance with embodiments herein, is illustrated. An electron gun 665 comprises an electron source and an electron injector. The electron gun 665 defines various parameters of the generated electron bunches. The electron bunches are sent through a first linear accelerator unit 680A. As shown in FIG. 6C, the linear accelerator unit 680 contains a $1^{st}$ through $N^{th}$ superconducting radio frequency (SRF) cavities 682-686. The series of SRF cavities 682-686 accelerate the electron bunches to relativistic velocities.

Upon accelerating the electron bunches to relativistic velocities, the electron bunches are sent a chicane 660. The chicane 660 comprises a plurality of magnets that generate magnetic fields that are capable of dispersing and focusing electron beams. The chicane 600 comprises various magnetic assemblies that are capable of generating magnetic bend features for maintaining the required compression of the electron beam during acceleration. The chicane 600 is also capable of generating synchrotron energy that can be harnessed for metrology purposes. As such, synchrotron energy may be captured by various SR units 440 strategically placed proximate to the chicanes 660. The SR units 440 then provide the captured synchrotron energy to various metrology tools 430.

The electron beam from the chicane 660 is provided to a second linear accelerator unit 680A. Upon accelerating the electron bunches to relativistic velocities, the electron bunches are sent to an undulator 695. The undulator 695 comprises a plurality of strategically positioned magnets of alternating polarity. The undulator 695 comprises an undulator period and magnetic strength parameters for a particular electron beam energy. The undulator 695 is used to oscillate the electron bunches to generate radiation that is proportional to the undulator period, undulator magnetic strength, and the electron beam energy provided by the SRF cavities to yield the desired wavelength give the undulator configuration. After processing by the undulator 130, the energy is sent to a separator 692, which separates the generated radiation and the electron beam, which may be recycled or dumped, as indicated by the electron dump 150. The generated radiation is provided to the EUV optics 160, which then processes the radiation and provides radiation (FEL laser light) compatible with photolithography. The FEL laser may then be used to perform lithography processing and/or metrology analysis upon semiconductor wafers.

Figure 7:
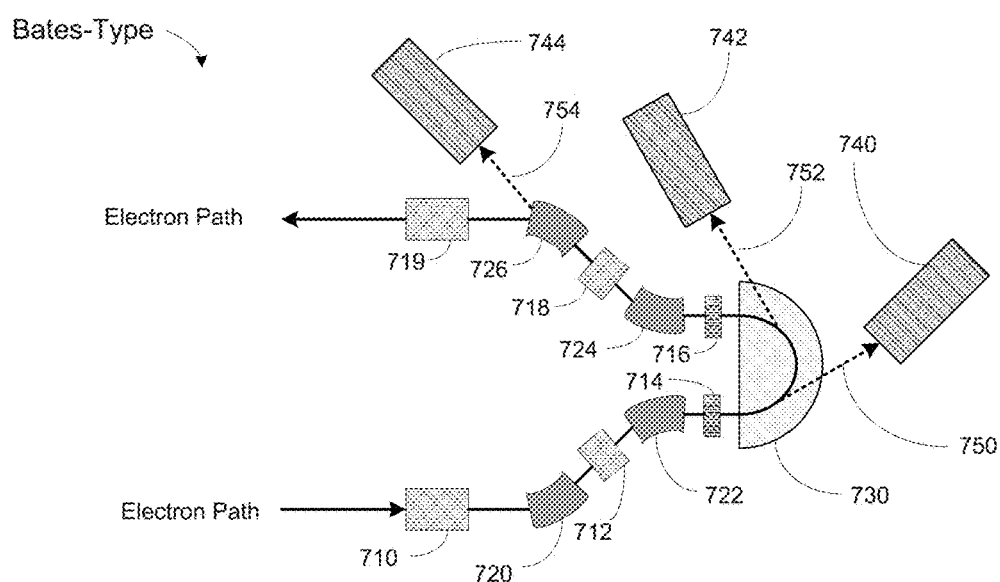
FIG. 7 illustrates a stylized depiction of portion of a multi-pass electron accelerator comprising a Bates-type electron path bend, in accordance with embodiments herein.

Turning now to FIG. 7, a stylized depiction of portion of a multi-pass electron accelerator comprising a Bates-type electron path bend, in accordance with embodiments herein, is illustrated. The bend portion of the electron path in a multi-pass accelerator may comprise a plurality of magnets that redirect the electron path. For example, the bend of the electron path may comprise a phase space correcting (PSC) magnet, or set of magnets, 710, through which the electron bunch travel. Subsequently, a first 45° dipole magnet 720 may alter the electron path by 45°. The electron bunch may then travel through a second PSC magnet 712, a second 45° dipole magnet 722 that reinstates the path back 45°, and a third PSC magnet 724. Generally, the EUV path and the electron beamline follow the electron beam path.

The magnets 710-724 alter the electron path such that the electron path is positioned to enter a 180° dipole magnet 730. The 180° dipole magnet 730 alters the electron path by 180°. At a first bend portion of the 180° dipole magnet 730, synchrotron radiation may be directed, as shown by a synchrotron radiation path 750, to a first metrology tool 740 capable of using light energy provided by the synchrotron radiation path 750 (as illustrated by the described example layout and space constriction of the bend assembly) for performing metrology inspection.

At a second bend portion of the 180° dipole magnet 730, synchrotron radiation may be directed, as shown by a synchrotron radiation path 752, to a second metrology tool 742 capable of using light energy provided by the synchrotron radiation path 752 for performing metrology inspection.

The path of the electron bunch may be directed through a fourth PSC magnet 716 followed by a third 45° dipole magnet 724 that alters the path by 45°. The path may be subsequently directed through a fifth PSC magnet 718 followed by a fourth 45° dipole magnet 726, followed by a sixth PSC magnet 719. In one embodiment, synchrotron radiation may be directed, as shown by a synchrotron radiation path 754 may be directed to a third metrology tool 744. Accordingly, in the example illustrated in FIG. 7, at least three metrology tools or tool sets may be provided with light energy from the synchrotron radiation from the bends in the electron paths from a Bates-type bend portion of a multi-pass electron accelerator.

Figure 8:
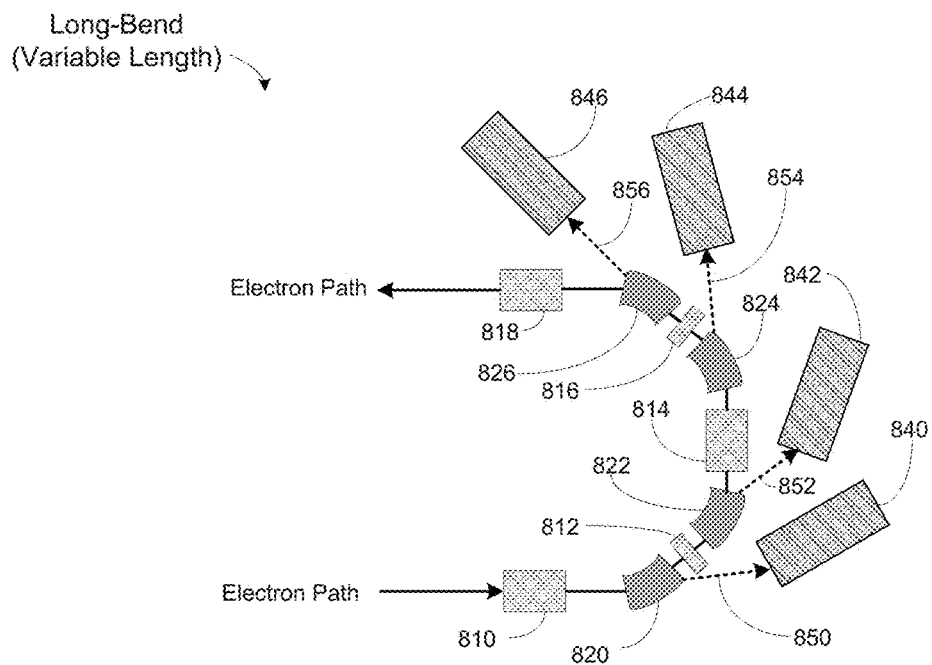
FIG. 8 illustrates a stylized depiction of portion of a multi-pass electron accelerator comprising a long-bend electron path bend, in accordance with embodiments herein.

Turning now to FIG. 8, a stylized depiction of portion of a multi-pass electron accelerator comprising a long-bend electron path bend, in accordance with embodiments herein, is illustrated. The long-bend portion (variable length, and therefore, variable number of bend magnets) of the electron path in a multi-pass accelerator may comprise a plurality of magnets that redirect the electron path. For example, the bend may comprise a first phase space correcting (PSC) magnet 810 through which an electron beam travels. Those skilled in the art would appreciate that regarding the variable number of bend magnets, a plurality of such magnets will dictate the total number of available metrology tools supported by the SR units 440, as well as the total angular path correction of which must total the desired bend angle.

The direction of the electron beam may be altered by 45° by a first 45° dipole magnet 820. The electron path may be configured through a second PSC magnet 820, followed by a second 45° dipole magnet 822, which provides another 45° direction change, totaling 90°.

The electron path continues through a third PSC magnet 814, through a third 45° dipole magnet 824, a fourth PSC magnet 816, a fourth 45° dipole magnet 826, followed by a fifth PSC magnet 819. The first through fourth 45° dipole magnets 820-826 complete a 180° bending of the electron path.

At each of the 45° bends corresponding to the first through fourth 45° dipole magnets 820-826, synchrotron radiation is generated. At a first bend portion of the first 45° dipole magnet 820, a synchrotron radiation path 850 is provided to a first metrology tool 840 capable of using light energy provided by the synchrotron radiation for performing metrology inspection. At a second bend portion of the second 45° dipole magnet 822, a synchrotron radiation path 852 is provided to a second metrology tool 842 capable of using light energy provided by the synchrotron radiation for performing metrology inspection. At a third bend portion of the third 45° dipole magnet 824, a synchrotron radiation path 854 is provided to a third metrology tool 844 capable of using light energy provided by the synchrotron radiation for performing metrology inspection. At a fourth bend portion of the third 45° dipole magnet 826, a synchrotron radiation path 856 is provided to a fourth metrology tool 846 capable of using light energy provided by the synchrotron radiation for performing metrology inspection.

Figure 9:
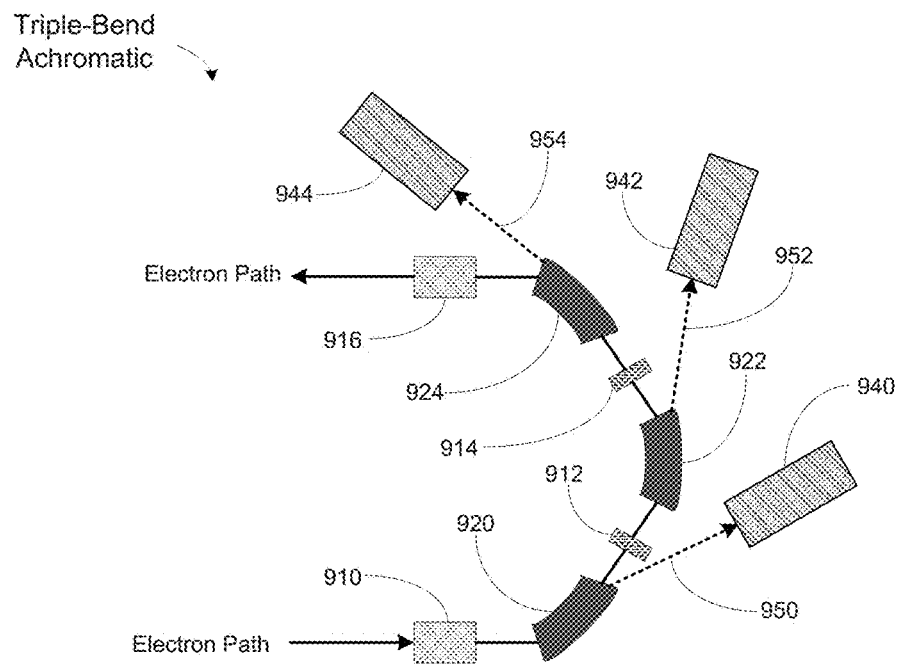
FIG. 9 illustrates a stylized depiction of portion of a multi-pass electron accelerator comprising a triple-bend electron path bend, in accordance with embodiments herein.

Turning now to FIG. 9, a stylized depiction of portion of a multi-pass electron accelerator comprising a triple-bend achromatic electron path bend, in accordance with embodiments herein, is illustrated. The triple-bend portion of the electron path in a multi-pass accelerator may comprise a plurality of magnets that redirect the electron path. For example, the bend may comprise a first phase space correcting (PSC) magnet 910 through which an electron beam travels. The direction of the electron beam may be altered by 60° by a first 60° dipole magnet 920. The electron path may be configured through a second PSC magnet 912, followed by a second 605° dipole magnet 922, which provides another 60° direction change totaling 120°. The electron path continues through a third PSC magnet 914, through a third 60° dipole magnet 924, followed by a fourth PSC magnet 916. The first, second and third 60° dipole magnets 920-924 complete a 180° bending of the electron path.

At each of the 60° bends corresponding to the first through third 60° dipole magnets 920-924, synchrotron radiation is generated. At a first bend portion of the first 60° dipole magnet 920, a synchrotron radiation path 950 is provided to a first metrology tool 940 capable of using light energy provided by the synchrotron radiation for performing metrology inspection. At a second bend portion of the second 60° dipole magnet 922, a synchrotron radiation path 952 is provided to a second metrology tool 942 capable of using light energy provided by the synchrotron radiation for performing metrology inspection. At a third bend portion of the third 60° dipole magnet 924, a synchrotron radiation path 954 is provided to a third metrology tool 944 capable of using light energy provided by the synchrotron radiation for performing metrology inspection.

In one embodiment, the wavelength of the synchrotron radiation illustrated in FIGS. 7-9 may be defined by Equation 1.

$$\lambda_c(nm) = \frac{[1.864]}{E_e^2(GeV)B(T)} \qquad \text{Equation 1}$$

Wherein $\lambda_c$ is the central wavelength, $E_e$ is the electron beam energy, and B is the magnetic field. The metrology tools described herein may be configured to perform metrology inspection function using light energy characterized by the central wavelength $\lambda_c$.

Each of synchrotron radiation paths illustrated in FIGS. 7-9 each may be driven by synchrotron radiation (SR) unit that is capable of directing the synchrotron radiation from the bend portion of the electron paths to the metrology tools. Those skilled in the art having benefit of the present disclosure would appreciate that the examples illustrated in FIGS. 7-9 are not limiting. The examples of FIGS. 7-9 illustrate possible usage example of bend magnet configurations in accordance with embodiments herein. Those skilled in the art having benefit of the present disclosure would appreciate that various SR units 440, metrology tools 430 may be inserted at any bend magnet locations that alters the trajectory of high current electron beam and remain within the spirit and scope of the present disclosure.

Figure 10:
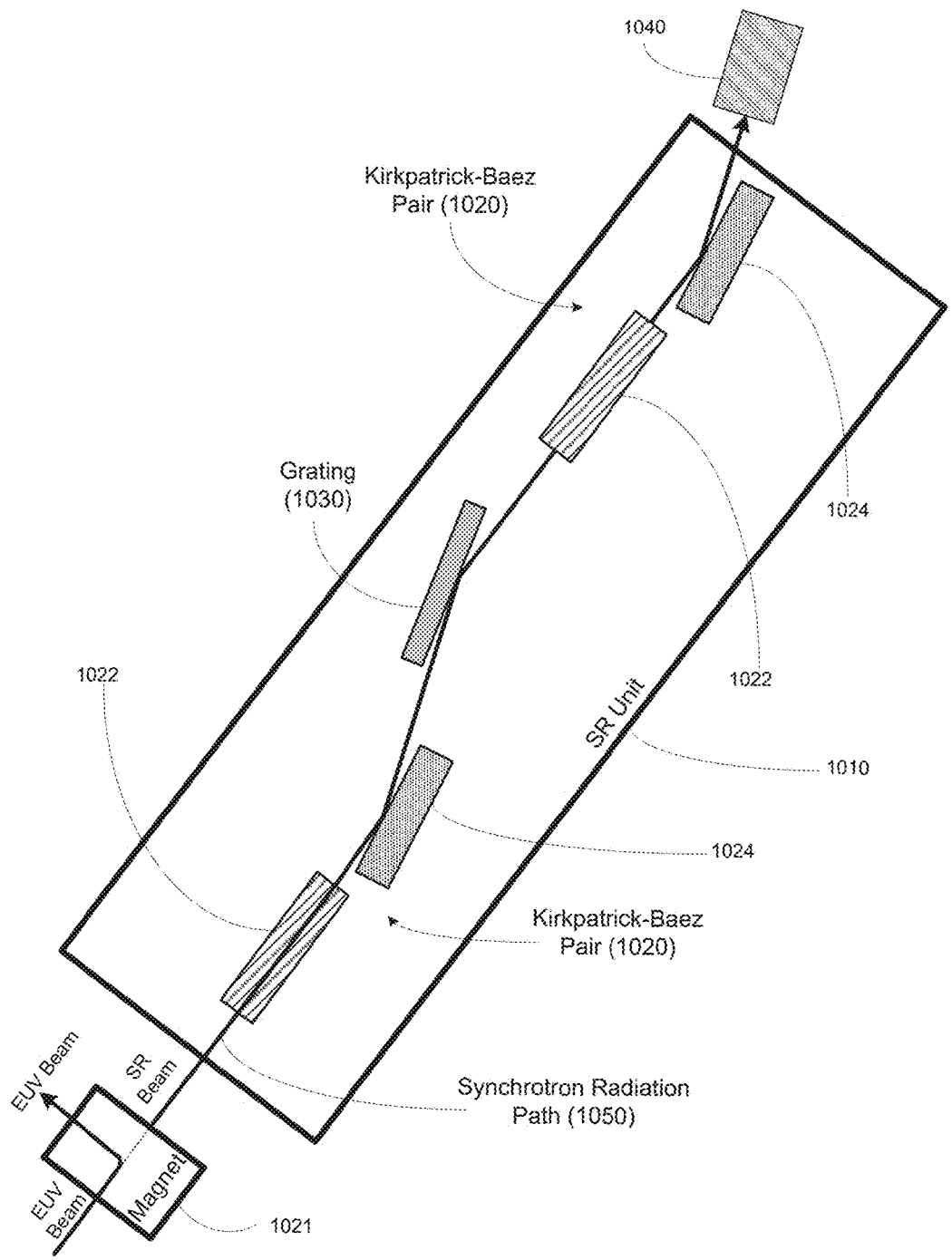
FIG. 10 illustrates a stylized depiction of such an SR unit in accordance with embodiments herein.

FIG. 10 illustrates a stylized depiction of such an SR unit in accordance with embodiments herein. As illustrated in FIG. 10, an electron beam may pass through a magnet 1020 that may cause the electron beam to bend. The bent electron beam continues in a similar manner described above. At the bend portion of the electron beam path, synchrotron radiation is provided to an SR unit 1010 via beamline 1050. The SR unit 1010 may comprise of one or more gratings 1030 and a plurality of Kirkpatrick-Baez mirror pair (KB pair) 1020.

Each of the KB pairs 1020 may comprise a vertical focusing mirror portion 1022 and a horizontal focusing mirror portion 1024 for controlling the spatial and spectral resolution of the beamline 1050. The beamline 1050 may be directed to a first KB pair 1020, followed by the grating(s) 1030 for spectral resolution selection. The beamline 1050 may then be directed to a second KP pair 1020 for further refinement of the spatial resolution of the beamline 1050. The beamline 1050 may then be provided to a metrology tool 1040. In an alternative embodiment, the magnet 1021 may be a part of the SR unit 1010. The SR unit 1010 may be positioned at a plurality of bend portions of an electron path for capturing and directing synchrotron radiation to one or more metrology tools 1040.

Figure 11A:
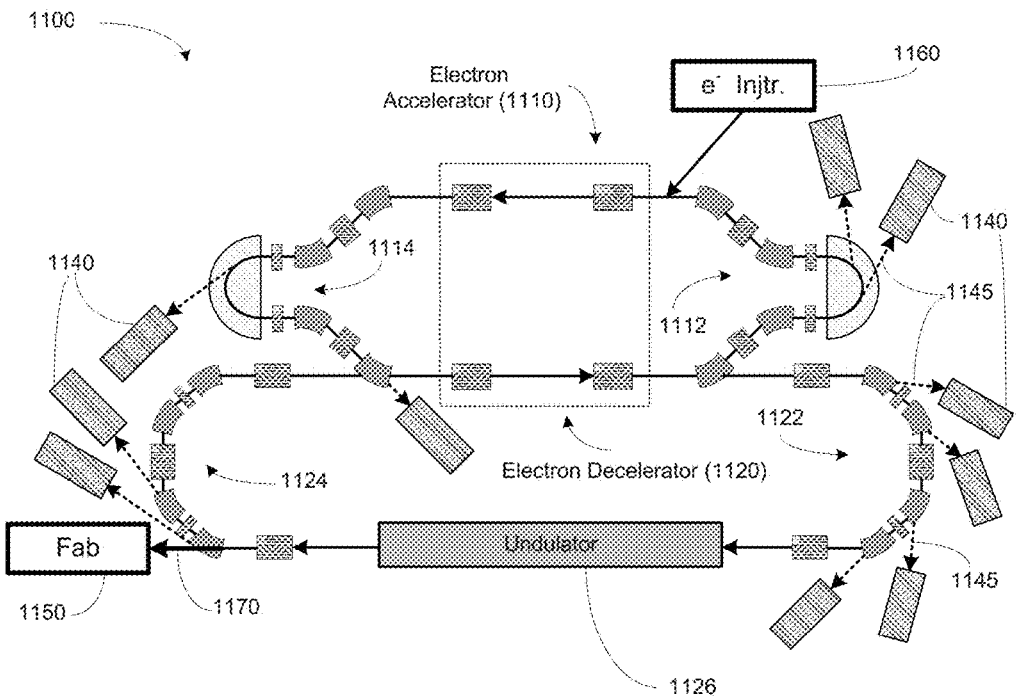
FIG. 11A illustrates a stylized depiction of a system for providing light energy for a semiconductor fab, in accordance with embodiments herein.
Figure 11B:
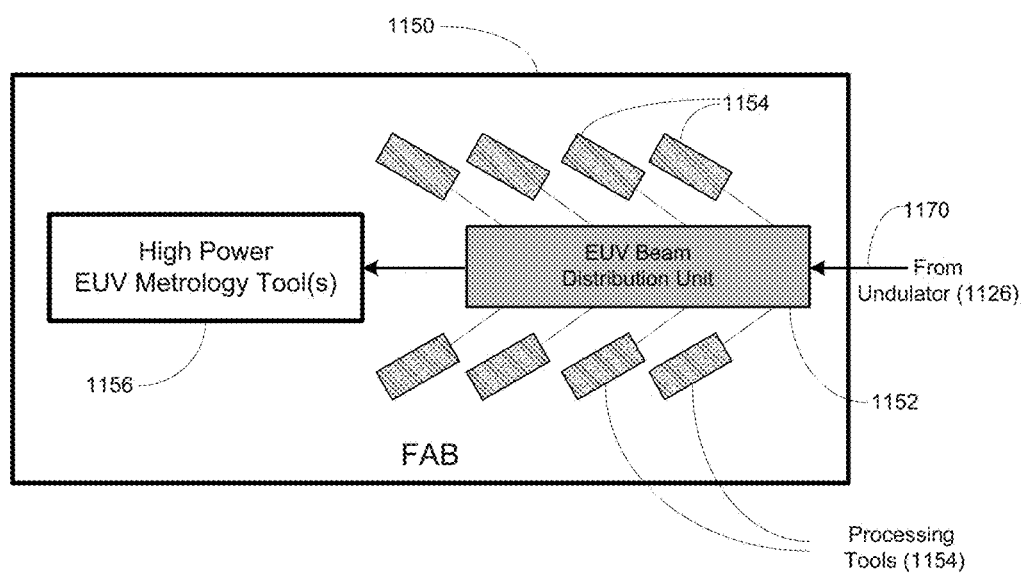
FIG. 11B illustrates a stylized depiction of a fab of FIG. 11A, in accordance with embodiments herein.

FIG. 11A illustrates a stylized depiction of a system for providing light energy for a semiconductor fab, in accordance with embodiments herein. FIG. 11B illustrates a stylized depiction of a fab of FIG. 11A in accordance with embodiments herein. Referring simultaneously to FIGS. 11A and 11B, a system 1100 may comprise a plurality of accelerators for providing light energy (e.g., EUV beam) for operations of photolithography tools and metrology tools. The system 1100 may comprise an electron accelerator 1110, which may in some embodiments be configured as an energy recovery linac, in which electron accelerator 1110 is operatively coupled with an electron decelerator 1120. That is, the accelerators 1110, 1120 may share a portion of their respective electron paths, and as such are comprised of the same SRF cavities 680. In one embodiment, accelerators 1110, 1120 are multi-pass electron accelerator/decelerators. Together, the accelerators 1100, 1120 may be configured to provide light energy to a plurality of metrology tools 1140 and processing tools, i.e. SR light is generated during both the acceleration and recirculation of the electron bunches as well as the subsequent deceleration and recirculation of the same electron bunches after they have been circulated through the undulator assembly 1126.

The energy recovery accelerator 1110 may comprise an electron path that comprises a first Bates-type electron path bend 1112 and a second Bates-type bend 1114 (similar to the Bates-type bend described above and in FIG. 7). An electron injector 1160 may provide electron bunches into the electron path of the accelerator 1110.

A portion of the electron path of the accelerator 1110 may be shared with the electron decelerator 1120. The EUV accelerator 1120 may comprise a first long-bend electron path bend 1122 and a second long-bend path 1124 (similar to the long-bend type electron path bend described above and in FIG. 8). The accelerator 1120 may also comprise an undulator 1126, which provides a beamline 1170 to a semiconductor manufacturing fab 1150.

Synchrotron radiation may be emitted at various magnets associated with the Bates-type bends 1112, 1114 and the long-bends 1122, 1124. The synchrotron radiation emitted at these magnets may be directed onto synchrotron radiation paths 1145 and onto metrology tools 1145. Should the accelerator be composed of a plurality of bend assemblies, multiple synchrotron radiation paths of various energy ranges could likewise be harnessed. Each of the synchrotron radiation paths 1145 may comprise an SR unit similar to the SR unit 1010 described above and in FIG. 10.

The beamline from the output of the undulator 1126 may be directed to the fab 1150. The fab may comprise an EUV beam distribution unit 1152 that is configured to distribute a portion of the energy of the beamline 1170 to various targets. The EUV beam distribution unit 1152 may comprise a plurality of incidence mirrors and/or other reflective objects that are capable of dividing and distributing the beamline 1170 into separate energy beams. The reflective feature of the incidence mirrors/reflective objects may be comprised of a metallic material or a substrate coated with a plurality of alternating materials (e.g., Mo/Si multi-layer mirror capable of near-normal incidence reflection) optimized for the wavelength of radiation being generated by the system 1100. The incidence mirrors/reflective objects of the EUV beam distribution unit 1152 may be controlled by various control system known to those skilled in the art having benefit of the present disclosure.

The fab 1150 may comprise a plurality of processing tools 1154 that comprise EUV scanners. The processing tools 1154 are capable of using the light energy provided by the EUV beam distribution unit 1152 to perform processing operations (e.g., photolithography processes) on semiconductor wafers.

The fab 1150 may also comprise a plurality of high-power EUV metrology tools 1156. A portion of the light energy from the beamline 1170 from the EUV beam distribution unit 1152 may be provided to the metrology tools 1156. The metrology tools 1156 are capable of performing inspection on processed semiconductor wafer using EUV energy.

Figure 12:
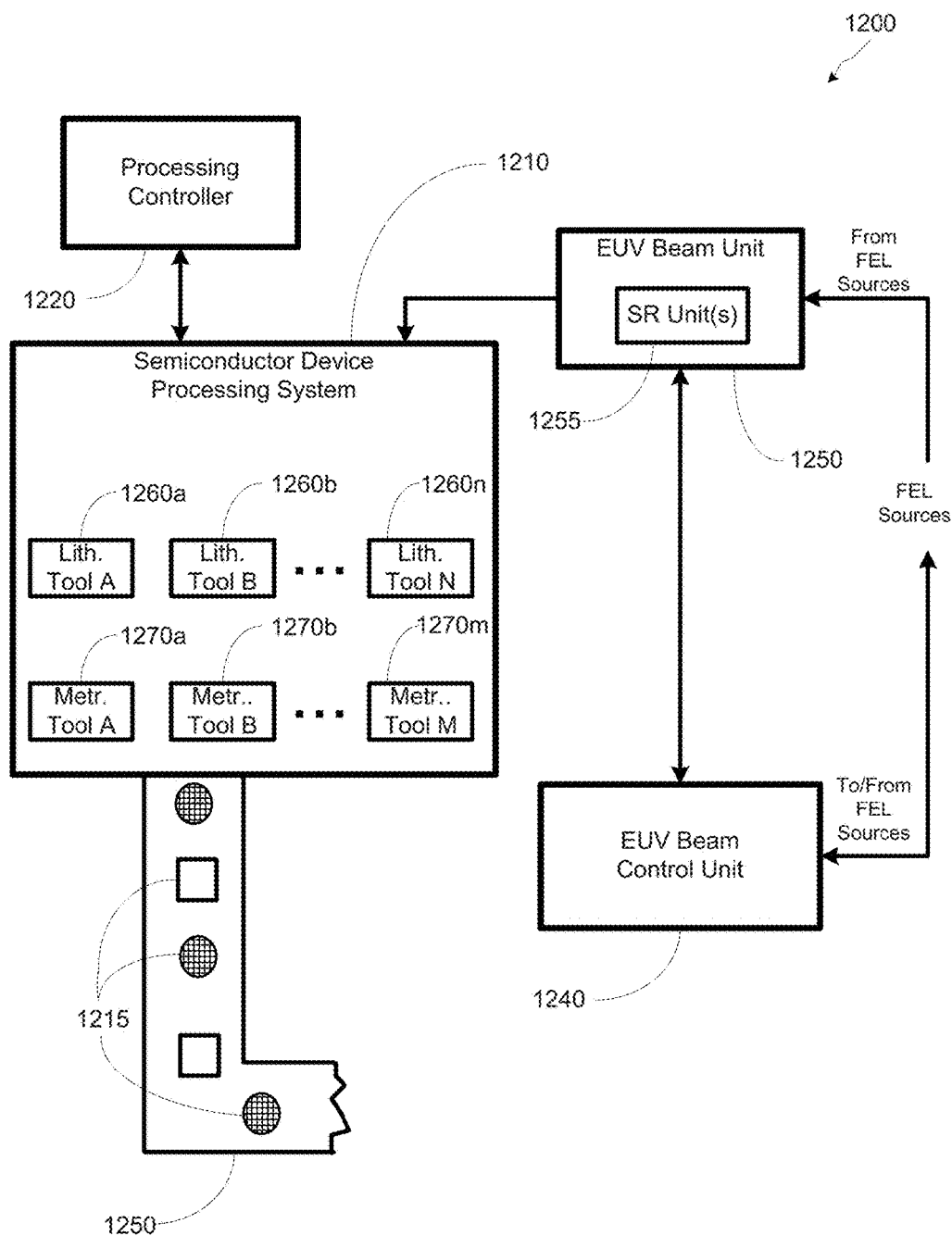
FIG. 12 illustrates a stylized depiction of a fab system for providing an EUV beam for performing processing and inspection of semiconductor wafers, in accordance with embodiments herein.

Turning now to FIG. 12, a stylized depiction of a system for providing an EUV beam for processing and inspecting semiconductor wafers, in accordance with embodiments herein, is illustrated. A semiconductor device processing system 1210 may manufacture integrated circuit devices by processing semiconductor wafers. The semiconductor device processing system 1210 may comprise various processing stations, such as etch process stations, photolithography process stations, CMP process stations, etc. The semiconductor wafers processed by these tools may be analyzed by metrology tools in the processing system 1210.

The processing system 1210 of FIG. 12 may comprise a plurality of lithography tools (1260a-1260n) that use EUV beams to perform lithography processing of semiconductor wafers. Further, the processing system 1210 may also comprise a plurality of metrology tools (1270a-1270m) that are capable of using light energy to perform metrology inspection of semiconductor wafers.

The system 1200 may comprise an EUV beam unit 1250 that is capable of providing one or more EUV beams for use by various lithography tools 1260a-1260n and metrology tools 1270a-1270m in the processing system 1210. The EUV beam unit 1240 may comprise one or more SR units 1255 (similar to the SR unit 1010 described above) that are capable of capturing and directing synchrotron radiation to the metrology tools 1270a-1270m. The EUV beam unit 1240 is also capable of dividing and distributing the EUV beams to the lithography tools 1260a-1260n. The EUV beam unit 1250 may receive an EUV beam from an FEL system. The EUV beam control unit 1250 is capable of controlling the operations of the EUV beam unit 1250. For example, the switching and distribution of the EUV beam to various locations in the processing system 1200 may be controlled by the EUV beam control unit 1240. Further, the EUV beam control unit 1240 may receive data indicative of the operations of an FEL system and make adjustments to the usage of the EUV beams as a result.

One or more of the processing steps performed by the processing system 1210 may be controlled by the processing controller 1220. The processing controller 1220 may be a workstation computer, a desktop computer, a laptop computer, a tablet computer, or any other type of computing device comprising one or more software products that are capable of controlling processes, receiving process feedback, receiving test results data, performing learning cycle adjustments, performing process adjustments, etc.

The semiconductor device processing system 1210 may produce integrated circuits on a medium, such as silicon wafers. The production of integrated circuits by the device processing system 1210 may be based upon the circuit designs provided to the processing controller 1220. The processing system 1210 may provide processed integrated circuits/devices 1215 on a transport mechanism 1250, such as a conveyor system. In some embodiments, the conveyor system may be sophisticated clean room transport systems that are capable of transporting semiconductor wafers. In one embodiment, the semiconductor device processing system 1210 may comprise a plurality of processing steps, e.g., the $1^{st}$ process step, the $2^{nd}$ process set, etc., as described above.

In some embodiments, the items labeled "1215" may represent individual wafers, and in other embodiments, the items 1215 may represent a group of semiconductor wafers, e.g., a "lot" of semiconductor wafers. The integrated circuit or device 1215 may be a transistor, a capacitor, a resistor, a memory cell, a processor, and/or the like. In one embodiment, the device 1215 is a transistor and the dielectric layer is a gate insulation layer for the transistor.

The system 1200 may be capable of performing analysis and manufacturing of various products involving various technologies. For example, the system 1200 may design and production data for manufacturing devices of CMOS technology, Flash technology, BiCMOS technology, power devices, memory devices (e.g., DRAM devices), NAND memory devices, and/or various other semiconductor technologies.

The system 1200 may be capable of manufacturing and testing various products that include transistors with active and inactive gates involving various technologies. For example, the system 1200 may provide for manufacturing and testing products relating to CMOS technology, Flash technology, BiCMOS technology, power devices, memory devices (e.g., DRAM devices), NAND memory devices, and/or various other semiconductor technologies.

The methods described above may be governed by instructions that are stored in a non-transitory computer readable storage medium and that are executed by, e.g., a processor in a computing device. Each of the operations described herein may correspond to instructions stored in a non-transitory computer memory or computer readable storage medium. In various embodiments, the non-transitory computer readable storage medium includes a magnetic or optical disk storage device, solid state storage devices such as flash memory, or other non-volatile memory device or devices. The computer readable instructions stored on the non-transitory computer readable storage medium may be in source code, assembly language code, object code, or other instruction format that is interpreted and/or executable by one or more processors.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method, comprising:
providing a beam using a first free electron laser (FEL) device comprising a first electron path bend; and
providing a first synchrotron radiation from said first electron path bend to a first metrology tool configured to perform a metrology inspection using said first synchrotron radiation.

2. The method of claim 1, further comprising:
providing a first portion of said beam to a processing tool; and
providing a second portion of said beam to a second metrology tool configured to perform a metrology inspection using said second portion.

3. The method of claim 1, wherein providing synchrotron radiation from said first electron path bend comprises directing said synchrotron radiation from a first magnet associated with said first electron path bend to said first metrology tool.

4. The method of claim 3, wherein directing said synchrotron radiation from a first magnet to said first metrology tool comprises using at least one horizontal focusing and vertical focusing mirror pair for directing said synchrotron radiation to said first metrology tool.

5. The method of claim 1, further comprising directing a second synchrotron radiation from a second electron path bend of said first FEL device to a second metrology tool configured to perform a metrology inspection using said second synchrotron radiation.

6. The method of claim 1, wherein providing said first beam portion comprises accelerating a first electron bunch in a first superconducting accelerator configured to direct the first electron bunch in a rotational path within said superconducting accelerator and into an undulator configured in parallel to said accelerator.

7. The method of claim 1, further comprising providing an EUV beam to a fab-beamline interface of a semiconductor manufacturing fab for providing said EUV beam to said plurality of processing tools and metrology tools.

8. An apparatus, comprising:
a first free electron laser (FEL) device for providing a first laser portion, said FEL device comprising a first electron path bend; and
a synchrotron radiation unit configured to provide a first synchrotron radiation from said first electron path bend to a first metrology tool configured to perform a metrology inspection using said first synchrotron radiation, said synchrotron radiation unit comprising a synchrotron radiation path and least a first focusing mirror for affecting said synchrotron radiation path.

9. The apparatus of claim 8, wherein said first focusing mirror is a vertical focusing mirror.

10. The apparatus of claim 9, further comprising a second focusing mirror for affecting said synchrotron radiation path, wherein said second focusing mirror is a first horizontal focusing mirror and said first focusing mirror is a first vertical focusing mirror.

11. The apparatus of claim 10, further comprising a grating positioned in series with first and second focusing mirror, a second horizontal focusing mirror, and a second vertical focusing mirror.

12. The apparatus of claim 8, further comprising a first magnet for providing said first electron path bend, wherein said first magnet provides an emission of said first synchrotron radiation.

13. The apparatus of claim 8, wherein said first FEL device comprises:
an electron source to provide an electron bunch;
a superconducting accelerator operatively coupled to said electron bunch, said superconducting accelerator configured to direct said electron bunch in a rotational path for providing an accelerated electron bunch, wherein said rotational path comprises at least one magnet for altering the path of said electron bunch and emitting synchrotron radiation; and
an undulator operationally coupled to said superconducting accelerator, said undulator for receiving said accelerated electron bunch to provide an FEL beam.

14. The apparatus of claim 13, wherein said undulator is configured in at least one of:
a parallel configuration with respect to said superconducting accelerator; or
a series configuration with respect to said superconducting accelerator, wherein said series configuration comprises a chicane in series with said accelerator.

15. The apparatus of claim 13, wherein said FEL beam is provided to a fab comprising a plurality of optical processing tools and optical metrology tools.

16. A system, comprising:
a semiconductor device processing system to process and inspect semiconductor wafers, said semiconductor device processing system comprising a plurality of optical processing tools and at least one optical metrology tool:
a processing controller operatively coupled to said semiconductor device processing system, said processing controller configured to control an operation of said semiconductor device processing system; and
a laser source for providing an extreme ultraviolet beam (EUV) to said semiconductor device processing system, said laser source comprising:
a free electron laser (FEL) device for providing a first laser portion, said FEL device comprising a first electron path bend; and
a synchrotron radiation unit configured to provide a first synchrotron radiation from said first electron path bend to a first metrology tool configured to perform a metrology inspection using said first synchrotron radiation, said synchrotron radiation unit comprising a synchrotron radiation path and least a first focusing mirror for affecting said synchrotron radiation path.

17. The system of claim 16, further comprising an EUV beam distribution unit configured to distribute a portion of said EUV beam to each of said optical processing tool and to said metrology tool, wherein said optical processing tools are photolithography tools.

18. The system of claim 16, wherein FEL device comprise:
an electron source to provide an electron bunch;
a superconducting accelerator operatively coupled to said electron bunch, said superconducting accelerator configured to direct said electron bunch in a first rotational path for providing an accelerated electron bunch, wherein said first rotational path comprises at least a first magnet for altering the path of said electron bunch and emitting synchrotron radiation; and
an undulator configured in parallel to said superconducting accelerator and operational coupled to said superconducting accelerator, said undulator for receiving said accelerated electron bunch to provide an FEL beam.

19. The system of claim 18, wherein said superconducting accelerator comprises a second rotational path coupled to said first rotational path, wherein said second rotational path is configured to recover synchrotron radiation, wherein said second rotational path comprises at least a second magnet for altering an electron path and emitting synchrotron radiation.

20. The system of claim 16, wherein said FEL device comprising a synchrotron radiation path comprising said first focusing mirror in series with a first horizontal focusing mirror, a grating, a second horizontal focusing mirror, and a second vertical focusing mirror, wherein said first focusing mirror is a first vertical focusing mirror.

* * * * *